United States Patent

[11] 3,632,899

[72] Inventor Itsuki Ban
829 Higashi-Oizumimachi, Nerima-ku,
Tokyo-to, Japan
[21] Appl. No. 850,772
[22] Filed Aug. 18, 1969
[45] Patented Jan. 4, 1972
[32] Priorities Aug. 19, 1968
[33] Japan
[31] 43/58525;
Aug. 20, 1968, Japan, No. 43/58922

[54] ENDLESS MAGNETIC TAPE INDICATOR APPARATUS WITH AUTOMATIC INDEX AFTER A TAPE CYCLE
6 Claims, 10 Drawing Figs.

[52] U.S. Cl. ..... 179/100.2 R, 242/55.19 R
[51] Int. Cl. ..... G11b 27/14
[50] Field of Search ..... 179/100.2 R; 242/201; 352/170, 171, 172

[56] References Cited

UNITED STATES PATENTS 2,224,383 12/1940 Githens et al. ..... 352/172
2,757,456 8/1956 Handa ..... 179/100.2 R
2,779,826 1/1957 Scott ..... 179/100.2 R
3,167,264 1/1965 Ohtsu ..... 242/201
3,471,096 10/1969 Hancock ..... 352/172

*Primary Examiner*—Stanley M. Urynowicz, Jr.
*Assistant Examiner*—Alfred H. Eddleman
*Attorney*—Jacobs & Jacobs

ABSTRACT: An endless magnetic tape indicator apparatus for an endless magnetic tape recording and reproducing apparatus wherein there is provided indication means which comprises, an index member rotatable by rotation of a rotary drive capstan for driving the tape, and a division member responsive to the index member. The index member is caused to be moved back to its starting position by a return device when a drive force between the capstan and the index member is disconnected in relation to an operation of a clutch device. The clutch device is operated by operating means in response to a conductive patch on the tape. The index member is automatically returned to the starting position whenever the tape effects one cycle.

INVENTOR
ITSUKI BAN
BY
Jacobs & Jacobs
ATTORNEY

INVENTOR
Itsuki Ban
BY Jacobs & Jacobs
ATTORNEY

INVENTOR
ITSUKI BAN
BY Jacobs + Jacobs
ATTORNEY

INVENTOR
ITSUKI BAN
BY Jacobs & Jacobs
ATTORNEY

ENDLESS MAGNETIC TAPE INDICATOR APPARATUS WITH AUTOMATIC INDEX AFTER A TAPE CYCLE

BACKGROUND OF THE INVENTION

BACKGROUND OF THE INVENTION

The present invention relates to an endless magnetic tape recording and reproducing system, and more specifically to a novel apparatus for indicating an endless magnetic tape driving volume.

A general endless magnetic tape recording and reproducing system has employed a tape cartridge containing an endless magnetic tape therein so that it is provided with tape drive means including a capstan, and a recording and reproducing circuit or the like with a magnetic head. The endless magnetic tape is provided with a plurality of record tracks thereon, each track is automatically changed over and successively played. A changeover of the track to be played is effected by a shifting mechanism step-by-step scanning the magnetic head in relation across the tracks in response to a conductive strip on the tape.

Use of the endless magnetic tape make it impossible to confirm what portion of the tape is played since each of record tracks is cyclically and continuously played. Where a plurality of songs or musical compositions are recorded on one record track on the tape, it is understood that it is desired to know where the song to be reproduced is located on the tape, or to know how long the track has played in order to change over to the next track, or to fast feed a portion of the tape on which the song undesired to be reproduced is recorded, or to determine how fast the tape is fed, or to confirm how extent the recording is made on the track when recorded thereon, or to know a position where the tape is played.

SUMMARY OF THE INVENTION

It is a primary object of the invention to provide an endless magnetic tape indicator apparatus for an endless magnetic tape recording and reproducing system wherein a recorded or reproduced tape length is indicated to determine the position where the tape to be is played.

Another object of the present invention is to provide an endless magnetic tape indicator apparatus for an endless magnetic recording and reproducing system wherein a tape length is indicated by indicating means which comprises an index member rotatable by imparting rotation of a capstan for driving the tape through a speed reducing device to the index member, and a division member having divisions each corresponding to the tape driving volume.

A further object of the invention is to provide an an endless magnetic tape indicator apparatus for an endless magnetic recording and reproducing system wherein an index member is automatically returned to its starting position by return means when a clutch device disconnects a drive transmission between a clutch and the index member in response to a conductive strip on the tape, the tape length may be remeasured whenever the tape effects one cycle.

A further object of the invention is to provide an endless magnetic tape indicator apparatus for an endless magnetic recording and reproducing system wherein rotation of a capstan is reduced at a high reduction ratio by a simple mechanism and imparted to an index member, a speed reducing device is provided so that the index member makes at least more than one rotation even if the tape effects one cycle.

Still further object of the invention is to provide an endless magnetic tape indicator apparatus for an endless magnetic tape recording and reproducing system, having a tape fast feed control device wherein the tape is automatically fed at normal speed after the tape is fast fed by a designated driving volume by aid of rotation of a shaft to which an index member is mounted.

This and the other objects and advantages of the invention will be understood from the following description as to a preferred embodiment referring to the accompanying drawing.

DESCRIPTION OF THE PREFERRED EMBODIMENTS

Figure 1:
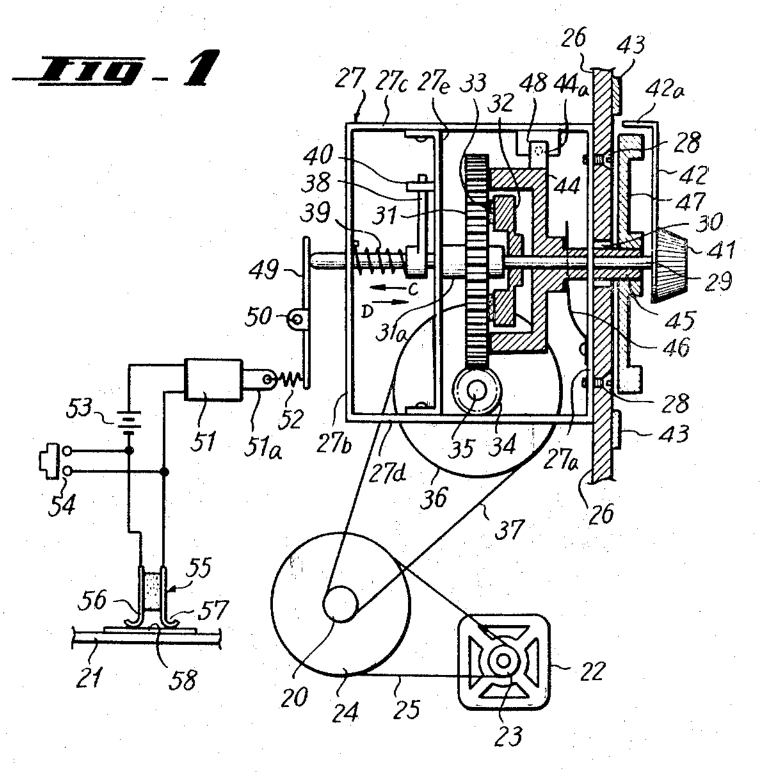
FIG. 1 is a schematic plan view of one illustrative embodiment of the invention.

FIG. 1 is shows one embodiment of a magnetic tape driving volume indicator apparatus, according to the present invention, which is mounted within a magnetic tape recording and reproducing apparatus utilizing an endless magnetic tape cartridge.

Numeral 20 indicates a capstan which regulates a drive of an endless magnetic tape 21 and the magnetic tape running indicator apparatus. The capstan 20 is rotatably mounted within the housing of the recording and reproducing apparatus. The capstan 20 is adapted to cooperate with the pinch roller (not shown) of the cartridge when the cartridge is urged into its operating position. The capstan 20 is driven from an electric motor which is connected to the capstan by pulleys and belt. The motor pulley 23 drives a capstan pulley 24 through the belt 25. The motor 22 is, for example, an induction motor with a first and second field coils (not shown) for obtaining octapolar and bipolar rotatory magnetic field. As will be described in the foregoing, the field coils are selected and excited.

Numeral 26 is a panel which forms a part of the housing and within which a substantial rectangular frame 27 having a front wall 27*a*, rear wall 27*b*, upper wall 27*c*, and a lower wall 27*d* is secured through screws 28. A partition wall 27*e* parallel to the front wall 27*a* is firmly mounted between the upper wall 27*c* and lower wall 27*d*. A shaft 29 is rotatably and slidably mounted in bores (not shown) formed in the rear wall 27*b*, the partition wall 27*e*, and the front wall 27*a*, respectively. The shaft 29 at one end passes through a bore 30 formed in the panel 26 and projects outwardly therefrom and at the other end passes through the bore formed in the rear wall 27*b* and projects outwardly therefrom. The shaft 29 is connected through a clutch device and a speed reducing device to the capstan 20 and normally rotated with rotation of the capstan 20. The clutch device comprises a worm wheel 31 rotatably mounted through the sleeve 31*a* to the shaft 29 and a friction disk 32 which is secured to the shaft 29 oppositely of the worm wheel 31 and is provided with a friction member 33 of rubber of the like on the one side of the worm wheel 31.

The speed reducing device comprises a worm 34 meshing with the worm wheel 31 of the clutch device, a pulley 36 mounted on an axis 35 to which the worm 34 is fixed, and a belt 37 trained between the pulley 36 and the capstan 20. The one end of the shaft 29 is firmly carried by a lever 38 and the rear wall 27*b* at a portion thereof, respectively. The shaft 29 is normally urged by compression elasticity of a spiral spring 39 wound thereto in the direction of arrow C thereby the friction member 33 of the friction disk 32 abuts against the worm wheel 31 at one side thereof. Rotation of the capstan 20 is caused to reduce its speed by means of the belt 37, the pulley 36, the worm 35, the worm wheel 31, and the friction disk 32 and is imparted to the shaft 29 while the shaft 39 rotates against elasticity of the spiral spring 39. The spiral spring 39 functions not only to urge the shaft 29 in the direction of arrow C but also to rotate the shaft 29 in the direction reversed to a direction in which the shaft 29 is rotated by the capstan 20. As will be described, upon disengagement of the friction disk 32 with the worm wheel 31, the shaft 29 is rotated by spiral spring 39 until the lever 38 is engaged with the stopper pin 40 mounted to the partition wall 27*e*.

A knob 41 and a pointer 42 are fixed to the other top end of the shaft 29 outwardly projecting from the panel 26.

The right-angled tip end 42*a* of the pointer 42 is opposed to an annular division plate 42 resting against the surface of the panel 26. Indices 43*a*, 43*b* (FIG. 2) such as digits "0," "1," "2," "3," "4,"...are provided on the division plate 43. The divisions 43*a*, 43*b* are adapted to mark with minutes, for instance, when the endless magnetic tape 21 is moved at normal speed.

Rotatably and slidably mounted to the shaft 29 is a rotary drum 44 which is provided at the periphery thereof with a projection 44*a* and opposed to the worm wheel 31 on one side thereof. The sleeve 45 includes a step portion 45*a* which is received by a notch 46*a* (FIG. 2) of a leaf spring 46 one end of which is attached to the front wall 27*a*. The leaf spring 46 is given an elasticity urging the sleeve 45 in the leftward direction (FIG. 1). This elasticity allows the rotary drum 44 to frictionally engage the worm wheel 31.

A portion of the sleeve 45 passes through a bore (not shown) in the front wall and the bore 30 in the panel 26 and project outwardly therefrom. A dial 47 with the pointer 47*a* (FIG. 2) opposed to the divisions of the division plate 43 is firmly attached to a portion of the sleeve 45. The dial 47 and the rotary drum 44 begin their rotation as the worm wheel 31 is rotated, however, the projection 44*a* of the rotary drum 44 engages the stopper piece 48 mounted to the upper wall 27*a* to hold the drum 44 thereby the drum 44 and the worm wheel 31 are caused to slip. Where rotation of the rotary drum 44 is held by the stopper piece 48, the index 47*a* of the dial 47 indicates the digit "0" of the division plate 43 while the lever 38 engages the stopper pin 40 to allow the tip end 42*a* of the pointer 42 to point out the digit "0" of the division plate 43.

A lever 49 journaled at the intermediate portion by a pivot pin 50 is provided so as to be opposed to the rear end of the shaft 39 outwardly projecting from the rear wall 27*b*. The lever 49 is connected through a spring 52 to a plunger 51*a* of a solenoid 51 and is actuated by operation of the solenoid 51. The solenoid 51 is supplied with current from a power source 53 through a switch 54 or a contactor 55. The switch 54 is normally opened, and is manually closed. The contactor 55 contains two feeder contacts 56, 57 that ride on the endless magnetic tape 21. The feeder contacts 56, 57 are electrically separated, and are shortened by a conductive patch 58 secured to the tape 21 on the track end-start position.

The solenoid 51 is energized by the power source 53 to attract the plunger 51*a* when the switch 54 is closed or the feeder contacts 56, 57 are shortened. This causes the lever 49 to be swung about the pivot pin 50 in the clockwise direction. At this moment, the shaft 29 is urged in the direction of arrow D against the elasticity of the spiral spring 39. Movement of the shaft 29 in the direction of arrow D keeps the friction disk 32 away from the worm wheel 31 to disconnect the capstan 20 with the shaft 29 at the same time the shaft 29 is rotated by elasticity of the spiral spring 39 until the lever 38 is restrained by the stopper pin 40.

Figure 2:
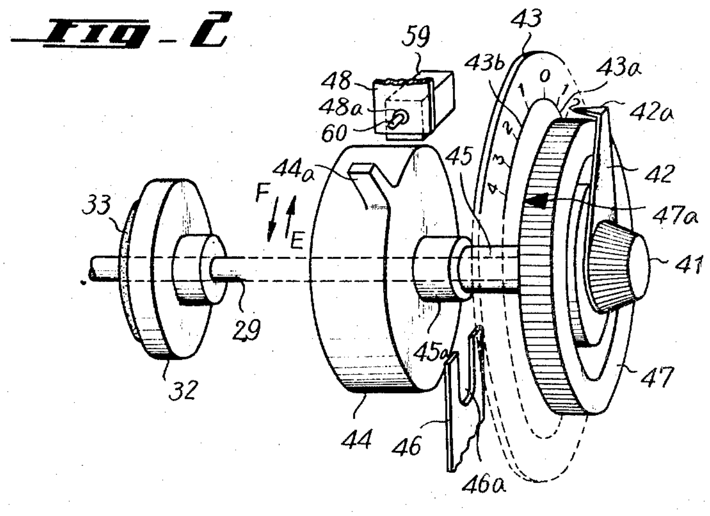
FIG. 2 is a perspective view showing a portion of the mechanism of FIG. 1 on an enlarged scale.

FIG. 2 is an enlarged representation of a substantial portion of the magnetic tape running indicator apparatus shown in FIG. 1. Like parts are designated by like numerals shown in FIG. 1.

Rigidly mounted to the stopper piece 48 is a microswitch 59 of which an actuator 60 projects from the stopper piece 48 passing through the bore 48*a* formed in the stopper piece 48. The actuator 60 is pressedly operated by engagement of the projection 44*a* of the rotary drum 44 with the stopper piece 48. The microswitch 59 includes a first switch (not shown) incorporated in a speaker driving circuit (now shown) included in the magnetic tape recording and reproducing apparatus, and a second switch (not shown) selectively energizing the previously mentioned field coils (not shown) of the electrical motor 22 (FIG. 1). While the actuator 60 of the microswitch 59 is admitted to be operated by the projection 44*a*, the first switch (not shown) is in a condition capable of operation of the speaker driving circuit (not shown) and the second switch (not shown) in a condition capable of exciting of the first field coil (not shown) for generating an octapolar rotary magnetic field coil (not shown). At this moment, the magnetic tape 21 (FIG. 1) is moved at normal speed and the reproducing sound is effected from the speaker (not shown). When the projection 44*a* moves away from the actuator 60, the first switch (not shown) is in a condition of deactuating of the speaker driving circuit (not shown) and the second switch (not shown) is in a condition capable of exciting the second field coil (not shown) for generating the bipolar rotary magnetic field. On the other hand, the magnetic tape (FIG. 1) is moved at a speed four times as fast as the normal speed and the speaker (not shown) is in an inoperative condition.

Now, a mode of operation and use of the apparatus shown in FIGS. 1 and 2 will be hereinafter described.

When the projection 44*a* of the rotary drum 44 engages the stopper piece 48 and depresses the actuator 60 of the microswitch 59, the motor 22, as previously mentioned, is rotated at low speed due to excitation of the first coil (not shown) for generating an octapolar rotary magnetic field. With rotation of the motor 22, the capstan 20 is rotated to drive the tape 21 at a normal speed while the shaft is rotated in the direction of arrow E of FIG. 2 from the speed reducing device and the clutch device. The pointer 42 is bodily rotated with the shaft 29 and the tip end 42*a* is moved along the division 43*a* of the division plate 43. If the magnetic tape is driven, as for instance, for 2 minutes, the pointer 42 is adapted to point out the digit "2," In other words, the division 43*a* of the plate 43 pointed out by the pointer 42 indicates the period for which the magnetic tape 21 is driven at a normal speed (it is considered as length by which the tape is driven).

When the conductive patch 58 on the magnetic tape 21 shorts the feeler contacts 56, 57 of the contactor 55, the solenoid 51 is actuated due to excitation by the power source 53 and the shaft 29 is moved in the direction of arrow D of FIG. 1 against elasticity of the spiral spring 39. As a result, the friction disk 32 is kept away from the worm wheel 31, and the shaft 29 is movably returned in the direction of arrow F of FIG. 2 by elasticity of the spiral spring 39 until the lever 38 engages the stopper pin 40. At this moment, the pointer 42 is returned to its normal position thereby the tip end 42*a* thereof point out the digit "0" of the division plate 43. Now the conductive patch 58 is kept away the contactor 55, the solenoid 51 is again involved in inoperative condition while the shaft 29 is moved in the direction of arrow C of FIG. 1 by elasticity of the spiral spring 39 to allow the friction disk 44 to frictionally engage the worm wheel 31. Consequently, the shaft 29 and the pointer 42 begin their rotation and then the operation as set forth in the foregoing is repeatedly performed.

Not shown in FIG. 1, a magnetic head is shiftably mounted by a shift mechanism to a position which it normally occupies relative to the tape 21. The shift mechanism comprises, for example, a displaceable member coupled to the magnetic head for positioning it with respect to a plurality of parallel record-tracks on the tape 21, cam means coactive with said member for controlling the transducer to play the record tracks, and a mechanism for shifting said cam means in single steps to position the magnetic head to successive record-track position. The mechanism for shifting cam means includes, for instance, a magnetic plunger (not shown) energized by the contactor 55. With this arrangement, a change over of the record-tracks on the tape 21 which is played each time the conductive patch 58 passes over the contactor 55, is effected. And, the pointer 42 is returned to the position indicated by digit "0" on the division plate 43 and is rotated in response to the tape driving to show the tape driving period. It will be readily understood that the pointer 42 is manually returned to the position indicated by the digit "0."

If the dial 47 is rotated in the leftward direction in FIG. 2, the rotary drum 44 is rotated therewith to keep the projection 44*a* away from the armature 60 of the microswitch 59. As a result, the capstan 20 is rotated at a speed four times as fast as before thereby the tape 21 is fast fed. During frictional engagement of the drum 44 with the worm wheel 31, the former is rotated in the rightward direction in FIG. 2 until the projection 44*a* engages the stopper piece 48. Arrest of rotation of the drum 44 causes the motor 22 to be rotated at a low speed to drive the tape 21 at a normal speed. Volume at which the tape is fast driven is determined by the degree of rotation of the dial 47. For example, the dial 47 is rotated to have the index 47*a* point out the digit "4" of the division plate 43*b* and this causes the tape is fast driven for a length of tape corresponding to that at which the tape is driven at a normal speed for 4 minutes. During fast feed of the tape, the pointer 42 is rotated to indicate the tape driving time.

The speed reducing device composed of the belt 37, the pulley 36, the worm 34, the worm wheel 31 is required to be so designed that value of its reduction ratio is such that the shaft 29 makes at least no more than one rotation thereof even if the endless magnetic tape 21 effects one cycle. If the feeler contacts 56, 57 are shorted by the conductive patch 58 or the switch 54 is closed, there is a possibility that the solenoid 51 may be deactuated prior to the complete returning of the pointer 42 to the digit "O."

Figure 3A:
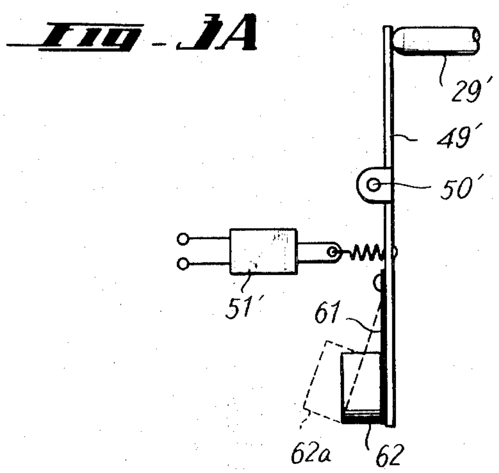
FIGS. 3A and 3B are representations showing modifications of the mechanism for operating the clutch device shown in FIG. 1.
Figure 3B:
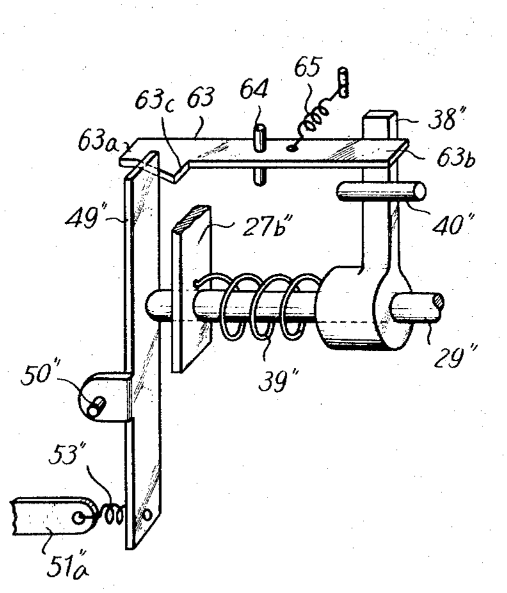

A return mechanism for the pointer 42 to eliminate the above-mentioned defect is shown in FIGS. 3A and 3B.

In FIGS. 3A and 3B, similar numerals, but primed or double primed, are used to illustrate like parts in FIG. 1.

A leaf spring 61 to which at the free end a weight 62 is fixed is mounted to a lever 49'. A solenoid 51' is supplied with current in pulse manner, a lever 49' is rotated around a pivot pin 50' in the clockwise direction in FIG. 3A to pressedly move the shaft 29'. Thereafter, the pointer 42 (FIG. 1) begins return to the digit "0." At this moment, the weight 62 is caused to vary a relative position with the lever 49' by inertia and is moved to a position indicated by at 62*a*, dotted line. As a result, it requires much time to have the lever 49' return to its original position after the solenoid 51' is deactuated so that the lever 49' keeps pushing the shaft 29' for a longer period. This enables the pointer 42 (FIG. 1) to be completely returned.

In FIG. 3B, one end 63*a* of an engaging lever 63 which is rotatably mounted by a pivot pin 64 normally abuts against a lever 49'' by elasticity of a spring 65. Other end 63*b* of the engaging lever 63 extends adjacent a stopper pin 40''. A lever 38'' fixed to a shaft 29'' engages the engaging lever 63 immediately before the lever 38'' engages the stopper pin 40''. Consequently, the engaging lever 63 is slightly moved by the lever 38'' against elasticity of the spring 65. A solenoid (not shown) is supplied with current in pulse manner. Upon rotation of the lever 49'' through the plunger 52'', the shaft is depressed against elasticity of the spiral spring 39'' at the same time the lever 49'' engages an engaging step portion 63*c* of the engaging lever 63. The shaft 29'' is thus maintained depressed by the lever 49'' to effect return of the pointer 42 (FIG. 1) to the digit "0" completely. After completion return of the pointer, the engaging lever 63 is depressed by the lever 38'' against elasticity of the spring 65 so that engagement of the lever 49'' with the engaging step portion 63 is relieved to return the lever 49'' and the shaft 29'' to the respective original positions.

A further embodiment of the invention will now be explained with reference to FIG. 4.

Numeral 70 designates to capstan which is rotatably provided for controlling driving of an endless magnetic tape 71 of an endless magnetic tape cartridge (not shown) and which is driven from an electric motor 72 that is connected to the capstan by pulleys and belt. Motor pulley 73 drives a capstan pulley 74 through a belt 75. Numeral 76 is a substantial rectangular frame provided with walls 76*a*, 76*b*, 76*c*, 76*d*, and a partition wall 76*e*. This frame is provided within a housing of an endless magnetic tape recording and reproducing device in which the apparatus according to the invention is employed. A shaft 77 is rotatably mounted in suitably aligned apertures (not shown) in the walls 76*a* and 76*b*, and the opposite ends of the shaft extends outwardly of the frame 76. Firmly mounted to one end of the shaft 77 is an inner side of a coil spring 78 which the outer side thereof secured to a pin 79 on the wall 76*b*. A rotation force is imparted to the shaft 77 by elasticity of the coil spring 78. The one end of the shaft 77 extending from the wall 76*a* projects outwardly of a panel 82 (FIG. 5) of a housing (not shown) through the bore therein. A knob 80 with a pointer 81 is rigidly mounted to the panel 82. The panel 82 is provided with a division 83 consisting of digits "O," "1," "2,"...to be aligned with the pointer 81, as seen from FIG. 5. Although a rotation force is imparted to the shaft 77 by elasticity of the coil spring 78 in the direction of arrow G as shown, rotation of the shaft is arrested when it is engaged by the stopper pin 84 mounted to the panel 82. At this moment, the pointer 81 points to the digit "O."

A bevel gear 85 is rotatably mounted to a rod 86 fixed at a right angle to the shaft 77 through a sleeve member 87. The bevel gear 85 meshes with a bevel gear 90*a* rotatably mounted to the shaft 77 through a sleeve 88 and a bevel 91*a* rotatably mounted to the shaft 77 through a sleeve 89. The bevel gears 90*a*, 91*a*, are parallel to each other to put the bevel gear 85 there between. The bevel gears 90*a*, 91*a* have the same number of teeth and are integrally formed with spur gears 90*b*, 91*b*, which have a different number of teeth. They are all made out of, for instance, plastic.

In parallel with the shaft 77, a shaft 92 is mounted in suitably aligned apertures (not shown) in walls 76*a* and 76*b*. Rotatably mounted to the shaft 92 through sleeve 93 are a spur gear 95*b* meshing with the spur gear 90*b* , and through sleeve 94 a spur gear 96*b* meshing with the spur gear 91*b*. The spur gears 95*b*, 96*b* are integrally formed with the bevel gears. They are all made out of, for instance, plastic. The bevel gears 95*a*, 96*a* have the same number of teeth while the spur gears 95*b*, 96*b* have a different number of teeth. The bevel gears 95*a*, 96*a* normally mesh different number of teeth. The a bevel gear 98 fixed to a shaft 97 rotatably and slidably mounted in suitably aligned apertures (not shown) in the walls 76*c*, 76*e*. The shaft 97 is retardedly rotated by the capstan 70 through a capstan pulley 99, belt 100, and a pulley 101. The shaft 97 is normally urged in the rightward direction in FIG. 4 by compressive elasticity of a spiral spring 102 interposed between the bevel gear 98 and the partition wall 76*e*. This maintains mesh of the bevel gear 98 with the bevel gears 95*a*, 96*a* . In relation to a disk member 103 fixed to one end of the shaft 97 projecting from the wall 76*c*, a right-angled tab 105*a* of a plunger 105 of a solenoid 104 is engageably disposed. The solenoid 104 is energized by a power source 106 through a switch 107, contactor 108. The contactor 108 is similar to the contactor 55 shown in FIG. 1 and contains two feeler contacts 109*a*, 109*b* electrically separate from each other. The two feeler contacts are shortened by a conductive patch 110 secured to a track end-start position on the tape 71. The switch 107 is normally opened and closed by the manual operation.

Figures 4, 5:
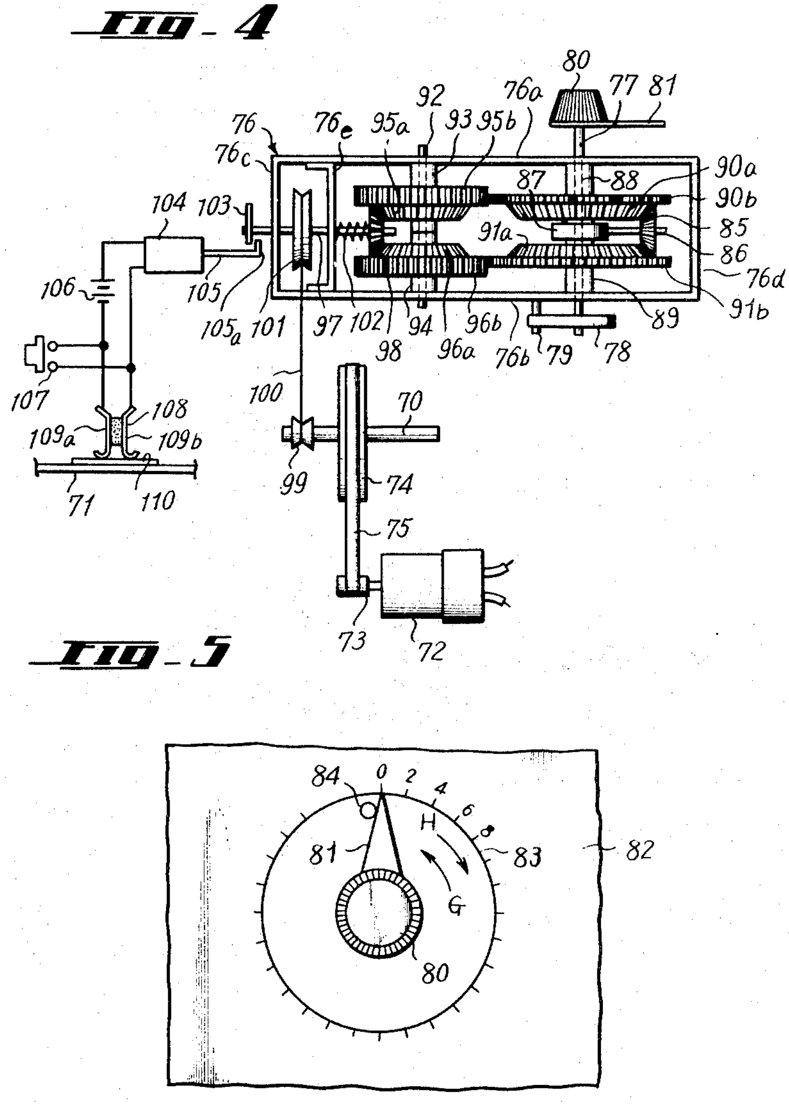
FIG. 4 is a schematic plan view of another embodiment of the invention.
FIG. 5 is a representation showing a relationship between the pointer of FIG. 4 and a division corresponding thereto.

The apparatus shown in FIG. 4 will be readily understood from the following description on mode of operation.

When the capstan 70 is rotated by the motor 72, the tape 71 is driven with rotation of the shaft 97. Rotation of the bevel gear 98 as the shaft is rotated is imparted to the bevel gear 85 through a first gearing comprising the bevel gear 95*a* the spur gear 95*b*, the spur gear 90*b*, and the bevel gear 90*a* and a second gearing including the bevel gear 96*a*, the spur gear 96*b*, the spur gear 91*b* and the bevel gear 91*a*.

If the numbers of teeth of the spur gears 95*b* and 90*b* are 101 and 100 respectively and the numbers of teeth of the spur gears 96b and 91b are 100 and 99, the gears 90a, 90b make 101/100 rotations when the spur gears 95b, 96b makes one rotation thereby the gears 91a, 91b make 100/99 revolutions in the reversed direction. Accordingly, the difference between the bevel gear 90a and 91a in the number of rotations, namely, 101/100 taken from 100/99, and the remainder is 1/9900 rotation. The bevel gear 85 is rotated about the rod 86 with rotation of the bevel gears 90a, 91a, and it may be rotated about the shaft 77 in response to the difference between the bevel gears 90a and 91a in the number of rotations. Rotation of the bevel gear 85 rotates the shaft 77 against elasticity of the coil spring 78 and causes the pointer 81 to be rotated with the shaft 77 in the direction of arrow H in FIG. 5. That is, with rotation of the capstan 80, the pointer 81 is rotated at predominant reduction ratio to indicate the tape driving period by means of the division 83. For example, presuming that the tape 71 is driven at normal speed for six minutes, the pointer points to the digit "O." The conductive patch 110 on the tape 71 shorts the feeler contacts 109a, 109b of the conductor 108, and thus the solenoid 104 is energized by the power source 106. At this time, the plunger 105 of the solenoid 104 and the shaft 97 is moved by the plunger 105, the disk member 103 in the leftward direction in FIG. 4 against elasticity of spring 102. Movement of the shaft 97 keeps the bevel gear 98 away from the bevel gears 95a, 96b. Thus, the shaft 77 is rotatably returned by the spring 78 until the pointer 81 engages the stopper pin 84. At this moment, the first and second gearings are rotated by the coil spring 78 through the rod 86 and the bevel gear 85.

When the tape 71 is continuously driven and the conductive patch is away from the contactor 108, the solenoid 104 is not supplied with current thereby the bevel gear 98 meshes with the bevel gears 95a, 96a and the pointer 81 initiates its rotation from the position, where the digit "0" is pointed, in the direction of arrow H as the capstan 70 is rotated. Thereafter, the tape driving period is indicated by the division 83 to which the pointer 81 points.

The pointer 81 may be automatically returned to "0" whenever the tape 71 completes one cycle and the conductive patch 108 shorts the feeler contacts 109a, 109b. From this it will be readily understood the pointer is also returned to "0" by manually operating the switch 107. It will be also readily apparent that the pointer is returned to the digit "0" at each time the track is changed over, as mentioned in the foregoing when the tape contains a plurality of record tracks.

Figure 6:
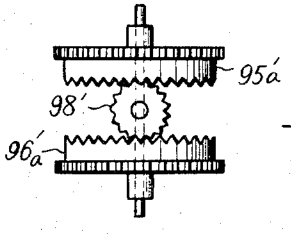
FIG. 6 is a representation showing a modification of the gearing shown in FIG. 4.

As shown in FIG. 4, the apparatus employs the bevel gears, however, gears as shown in FIG. 6 may be substituted.

Numeral 98′ in FIG. 6 is a gear corresponding to the bevel gear 98 and numeral 96′a is also a gear corresponding to the bevel gear 96a.

Figure 7:
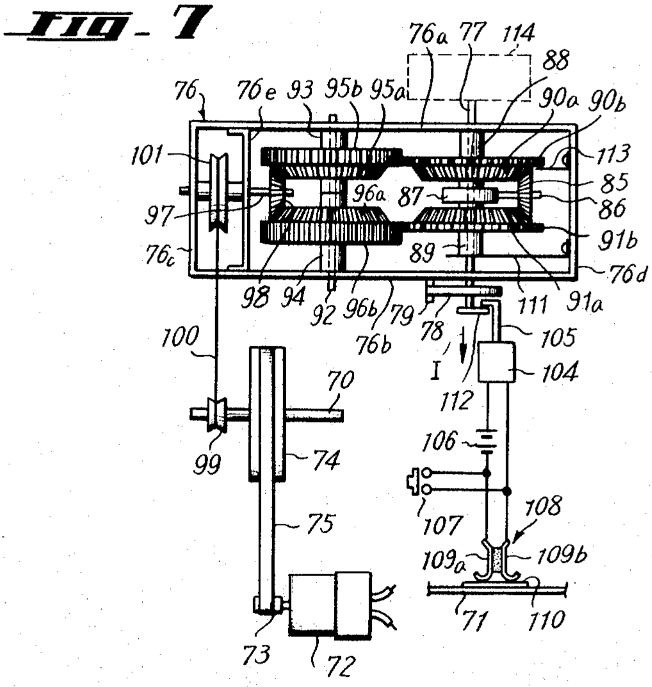
FIG. 7 is a schematic plan view of further embodiment of the invention.

FIG. 7 shows an alternative embodiment slightly different from the embodiment as previously shown with respect to the arrangement.

Figure 8:
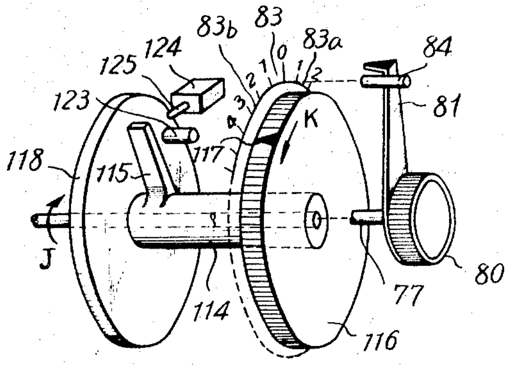
FIG. 8 is a perspective view showing a portion of the mechanism of FIG. 7 on an enlarged scale and in an exploded manner.
Figure 9:
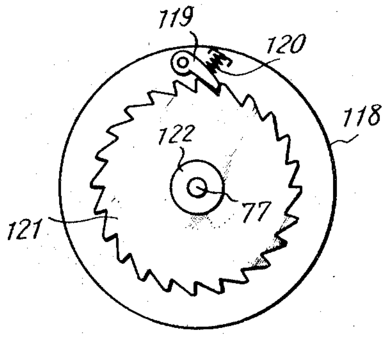
FIG. 9 is an illustration showing a ratchet mechanism provided in the disk shown in FIG. 8.

Similar numerals are used to illustrate like parts in FIG. 4. In FIG. 4, a clutch mechanism comprises the bevel gear 98 and the bevel gears 95a, 95b whereas a clutch mechanism in FIG. 7 includes the bevel gears 85 and 90a. Each one end of the bevel gears 90a and 91a engages the sleeve 89 at the one thereof and the other end is maintained in a position where it normally meshes with the bevel gear 85 by elasticity of a leaf spring 111 secured to the wall 76d. Accordingly, the shaft 73 is normally and rotatably driven with rotation of the capstan 70. Energization of the solenoid 104 by a power source 106 allows the shaft 77 to be moved in the direction of arrow I by a plunger 105 through a disk member 112 secured to the shaft 77. Movement of the shaft 77 in the direction of arrow I moves simultaneously the bevel gear 85 while movement of the gears 90a, 90b is arrested by a stopper pin 113 of which one end is fixed to the wall 76d. By disengagement of the bevel gear 85 from the bevel gear 90a, the shaft 75 is rotatably returned by the coil spring 78. When the solenoid 104 is not supplied with current, the shaft 77 is returned to its original position thereby the bevel gear 85 engages again the bevel gear 90a. Numeral 114 is an indicator element for indicating the tape running period, of which details are shown in FIGS. 8 and 9.

Similar numerals are used to illustrate like parts in FIGS. 4, 5 and 7.

Rotatably inserted into the shaft 77 in an indicator element or a sleeve 114 (FIG 8) having a lever 115 to which a dial 116 with an index 117, and a disk 118 are firmly mounted. As shown in FIG. 9, a pawl 119 mounted to the disk 118 is yieldingly urged by a compression spring 120 into engagement with a ratchet wheel 121 so that counterclockwise rotation or the ratchet wheel will drive the disk 118. The ratchet wheel 121 is frictionally coupled to the shaft 77 through a sleeve 122. Rotation of the shaft in FIG. 8 in the direction of arrow J is imparted to the sleeve 114 through the ratchet wheel 121, the pawl 119, and the disk 118 so that the sleeve 114 may be rotated until the lever 115 engages a stopper pin 123. Upon engagement of the lever 115 with the stopper pin 123, the sleeve 122 of the ratchet wheel 121 slips against the shaft 77. At this time, the index 117 on the dial 116 points to the digit "0" of the division 83. The division 83 is provided with a section 83a corresponding to the pointer 81 and a section 83b corresponding to the index 117, these sections are adapted to be graduated in either direction as centering around a common digit "O."

During arrestment of rotation of the sleeve 114 by the stopper pin 123, an actuator 125 of a microswitch 124 is pressedly operated by the lever 115. The microswitch 124 may perform the same operation as the microswitch 59 shown in FIG. 2. If the electrical motor 72 (FIGS. 4 and 7) be a motor which includes an electronic governor circuit, the microswitch 59 would be used so as to control actuation of the governor circuit. That is, the microswitch 59 when actuated maintains the governor circuit in operative condition, but when deactuated maintains the same in nonoperative position. During actuation of the governor circuit, the drive shaft of the motor 72 is rotated at a certain low speed, however the motor 72 is rotated at high speed if the governor circuit is deactuated. Thus, the dial 116 is in the original position where the index 117 points to the digit "O," and then the microswitch 124 is operated to drive the magnetic tape 71 at normal speed. On the other hand, if the dial 116 is in a position where the index 117 points to, for example, the digit "4" of the section 83b, the magnetic tape 71 is rotated at fast speed since the microswitch 124 is not actuated. In other words, if it is desired to drive the magnetic tape 71 at fast speed, this may be accomplished by manually rotating the dial 116 in the direction of arrow K. When the dial 116 is rotated to allow the index 117 to point to the digit "4" of the section 83b, the tape is fast driven for the length of tape which the tape would be driven at normal speed for 4 minutes and thereafter the dial 116 is returned to its original position with rotation of the shaft 77 to cause the tape 71 to change from its fast feed to normal feed.

As previously described, the shaft 77 is rotated in the direction reversed to that of arrow J whenever the tape 71 effect one cycle thereby the pointer 81 is returned to point to the digit "0." In the meantime, the dial 116 is adapted, as mentioned, to be freely rotated in relation to the shaft 77 and, in addition, the pawl 119 may not engage the ratchet wheel 121 thereby the dial 116 is maintained immovable.

In the embodiments as described in the above, the division is provided so that the driving volume of the magnetic tape is indicated and determined by the period, however, a scale or division may be graduated in distance in place of period.

While the features and advantages of the invention have been described in the foregoing with respect to preferred embodiments, as way of example, various changes and modifications may be made without limiting to the embodiments illustrated in the drawing within the scope of the appended claims.

What is claimed is:

1. An endless magnetic tape playing time indicator apparatus for an endless magnetic tape recording and reproducing system of a type wherein there is provided tape drive means including a rotary drive capstan for driving the tape, an electrical circuit having a magnetic head, and track changing means for changing over record tracks to be played on the tape in response to a conductive strip on the tape, comprising:

indication means having a rotary index member and a fixed scale member, said scale member including divisions relating to the tape playing time; transmission means for imparting rotation of said tape drive means to said rotary index member to rotate said rotary index member in a direction away from a predetermined starting position, said transmission means including a clutch device controlling transmission of drive power and a speed reducing device having a reduction ratio such that said index member does not make one rotation even if the tape is driven at one cycle; said speed reducing device having a rotary shaft on which said rotary index member is mounted, a pulley on an axle, a belt connecting said capstan and said pulley for rotation of said pulley at a reduced ratio, a worm coaxially mounted on said axle with said pulley, and a worm wheel mounted on said rotary shaft arranged to mesh with said worm; said clutch device including said worm wheel of said speed reducing device, a friction disk on said rotary shaft and opposed to one side of said worm wheel, and spring means urging said friction disk into frictional engagement with said worm wheel;

return means for returning said index member to the starting position when said clutch device breaks off transmission of dive power, said return means including means for axially moving said rotary shaft in a direction to move said friction disk out of frictional engagement with said worm wheel against the bias of said spring means; and operation means responsive to the conductive strip on the tape for actuating said clutch device to break off said transmission of drive power, whereby said index member is automatically returned to the starting position.

2. An endless magnetic tape driving volume indicator apparatus for an endless magnetic tape recording and reproducing system in accordance with claim 1 wherein said index member is rigidly fixed to said rotary shaft of said speed reducing device, said return means is connected to said rotary shaft, and said spring means is adapted to impart rotation force to said rotary shaft in the direction to return said index member to its initial position.

3. An endless magnetic tape driving volume indicator apparatus for an endless magnetic tape recording and reproducing system in accordance with claim 2 wherein said operation means includes a contactor having a pair of feeler contacts electrically separated from one another and adapted to be shorted by said conductive strip on the tape, and a solenoid having a plunger connected to said clutch device to operate the same and being adapted to be energized by said contactor.

4. An endless magnetic tape playing time indicator apparatus for an endless magnetic tape recording and reproducing system of a type wherein there is provided tape drive means including a rotary drive capstan for driving the tape, and electrical circuit having a magnetic head, and track changing means for changing over record tracks to be played on the tape in response to a conductive strip on the tape, comprising indication means having a rotary index member and a fixed scale member, said scale member including divisions relating to the tape playing time; transmission means for imparting rotation of said tape drive means to said rotary index member to rotate said rotary index member in a direction away from a predetermined starting position, said transmission means including a clutch device controlling transmission of drive power and a speed reducing device having a reduction ratio such that said index member does not make one rotation even if the tape is driven at one cycle; said speed reducing device including a rotary shaft on which said rotary index member is mounted; a first gear rotatable by rotation force of said capstan, a first train of gearings having a first foremost gear meshing with said first gear, and a first backmost gear rotatably mounted to said rotary shaft, a second train of gearings having a gear ratio different from that of said first train of gearings and including a second foremost gear meshing with said first gear, and a second backmost gear rotatably mounted on said rotary shaft and being arranged to rotate in the direction opposed to said first backmost gear, and a second gear rotatably mounted on a rod extending from said rotary shaft at a right angle and interposed between said first backmost gear and said second backmost gear to engage those gears and being rotatable about said rod as well as said rotary shaft; return means for returning said index member to the starting position when said clutch device breaks off transmission of drive power; and operation means responsive to the conductive strip on the tape for actuating said clutch device to break off said transmission of drive power, whereby said index member is automatically returned to the starting position.

5. An endless magnetic tape playing time indicator apparatus for an endless magnetic tape recording and reproducing system in accordance with claim 4 wherein said clutch device comprises on said speed reducing device said first gear fixed to an axially slidable shaft, on said speed reducing device said first and second foremost gears meshing with said first gear, and a spring member urging said first gear in a direction meshing with said first and second foremost gears whereby said first gear meshes with said first and second foremost gears by elasticity of said spring member and engagement of said first gear with said first and second foremost gears are relieved when said shaft of said first gear is axially moved by said operation means against elasticity of said spring means.

6. An endless magnetic tape driving volume indicator apparatus for an endless magnetic tape recording and reproducing system in accordance with claim 4 wherein said clutch device comprises said second gear on said reducing device, on said speed reducing device said first and second backmost gears rotatably and slidably mounted to said rotary shaft and meshing with said second gear, a spring member urging said second backmost gear in the direction meshing with said second gear, and means for preventing said first backmost gear from moving from a predetermined position whereby normally said second gear meshes with said first and second backmost gears by elasticity of said spring member, engagement of said second gear with said first backmost gear being relieved when said rotary shaft is axially moved by said operation means against said spring member.

* * * * *